Aug. 11, 1936.  A. HEKKING  2,050,948
DEVICE FACILITATING THE SLIP OF MOTOR CAR
TRAILERS COUPLED TO ONE OR SEVERAL AXLES
Filed Dec. 14, 1933
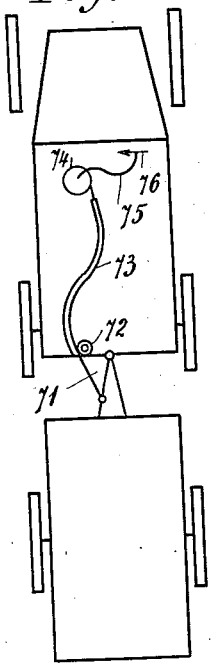
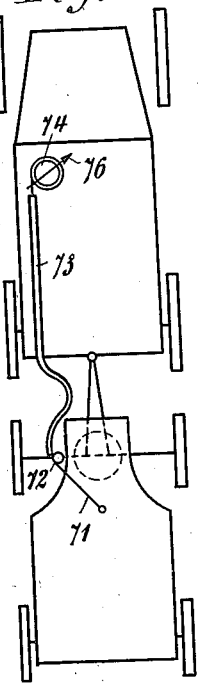
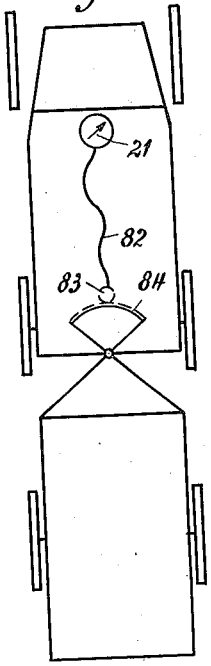
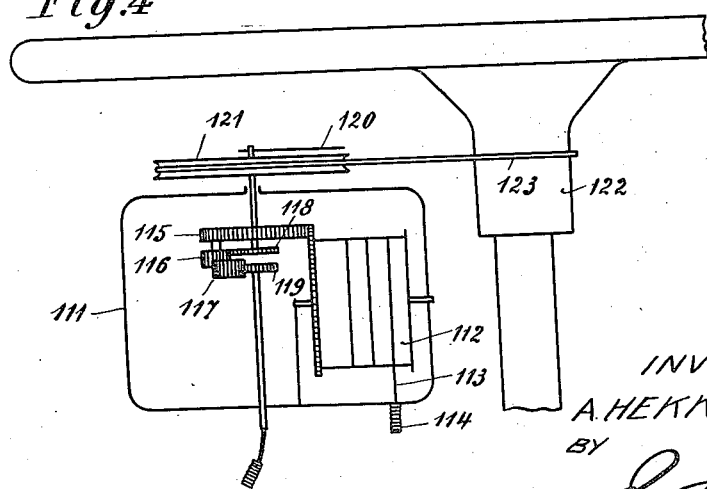
INVENTOR
A. HEKKING
BY
ATTY.

Patented Aug. 11, 1936

2,050,948

UNITED STATES PATENT OFFICE 2,050,948

DEVICE FACILITATING THE SLIP OF MOTOR CAR TRAILERS COUPLED TO ONE OR SEVERAL AXLES

André Hekking, Neuilly sur Seine, France

Application December 14, 1933, Serial No. 702,379
In France December 19, 1932

5 Claims. (Cl. 116—28)

It is a known fact that when running backwards, the coupled motor car trailers tend to "disrail", that is to say tend to create a rapidly increasing difference between the radius of curve of the trailer and that of the tractor (as such is the case with the two-wheeled trailer) or between the radii of curve of the tractor and the axles of the trailer (as such is the case with the four-wheeled trailer). It is further well known that it is substantially easy to reduce and to cancel the said difference when moving in due time and in the required direction, the steering wheel controlling the direction of the tractor. However, the said operation cannot in practice be easily performed and this for the following reasons:

1st—The driver does not notice the "derailment" until the same has already reached a considerable extent.

2nd—He must then meditate about to know whether he must steer to the right or to the left, and what is the amount of steering.

3rd—It is for him difficult, troublesome and often impossible to control both the steering of the tractor and that of this coupled trailer.

This invention provides means for indicating to the driver the direction and amplitude of the rotation he must impart to the steering wheel so as to insure steady reverse motion to the tractor and trailer. The invention further comprises means operable by another person for imparting sunpplementary motions to the steering wheel of the tractor in order to control the direction of the reverse movement of the trailer and tractor.

In the accompanying drawing given by way of example:

Figure 1 is a plan view in diagrammatic outline showing the invention.

Figure 2 is a similar view showing the cable of Figure 1 connected to the rear bogie of the trailer.

Figure 3 is a construction in accordance with the invention, including a modification as to the controlling mechanism for the operation of the pointer.

Figure 4 is a broken plan view showing a modification.

In the form of construction represented in Figs. 1 and 2, a cable 71 secured to the pole of the trailer (two wheels) or to the rear bogie (four wheels) and passes around a pulley 72, secured either to the rear of the tractor (case of the two-wheeled trailer) or to the front bogie of the trailer (case of a four-wheeled trailer). The arrangement of the said pulley and of the coupling point is such that all variations of the angle, tractor-trailer (two wheels) or the angle front bogie—rear bogie (four wheels), result in the passage around the pulley of a certain length of cable 71, in the one or in the other direction, according to the direction of "derailment". By virtue of a system of countershafts or of a soft casing 73, the cable comes to a drum 74 upon which it winds itself. The said drum contains a spring barrel. The drum 74 drives directly or through the medium of a flexible transmission 75, the angular motions of an index or pointer 76, placed in front of the driver.

According to the modified form of construction of Fig. 3, the revolution of the pointer 21 can be determined by a flexible wire 82 which is controlled by the mechanism consisting in the pinion 83 and the rack 84. The rack and the pinion are of course carried respectively by every one of the elements of the coupled train whose variations of position are to be recorded.

In Figure 4, a casing 111 encloses a barrel 112 upon which is wound a cable 113 protruding from a flexible casing 114. Said cable 113 corresponds to the cable 71 shown in Figures 1 and 2 and imparts to the barrel 112 rotation proportional to the lateral deviations or "derailment" of the trailer. The barrel 112 contains a return spiral spring. Said barrel further comprises a gearing or a friction surface driving a wheel 115 which acts as the big crown wheel in a spur wheel differential gear comprising planet wheels 116, 117 and sun wheels 118, 119. The sun wheel 118 is rigidly connected by an axle to a pointer 120 moving in front of a dial 121. This dial receives rotary motion from the steering wheel 122 through any suitable means.

In the embodiment shown, the casing 111 is secured to the steering column and an india-rubber belt 123 passes around the hub or any other part of the steering wheel and in a groove of the dial 121. This belt thus secures both the rotation of the dial 121 in conformity with the rotation of the steering wheel and the necessary adherence between the wheel 115 of the differential gear and the barrel 112. The second sun wheel 119 receives its motion through a flexible wire 125 which may be operated by a second person so placed as to be able to look backwards, in order to control the direction of the reverse motion of the trailer and tractor. The driver of the tractor has merely to look at the pointer 120 and to turn the steering wheel in such a manner that a mark traced on the dial 121 will constantly remain below said pointer. The position of the trailer with respect to the tractor will thus be stabilized during the reverse motion. A second person who is acting on the free end of the flexible wire 125 by means of a suitable button or handle will be able to control the direction of the reverse motion of the trailer and tractor by the fact that rotation of the wire 125 and sun wheel 119 will cause a supplementary rotation of the pointer 120 which, in turn, will induce the driver to give a supplementary rotation to the steering wheel.

It is obvious that:

1st—The apparatus in question can be disposed at any place on the tractor and particularly on the dash-board.

2nd—That the same can be divided into several parts spaced apart the one from the other and transmitting the respective actions by means of any suitable drive.

I claim:

1. A device for insuring the stability of the direction during reverse motion of motor car trailers, comprising means for transmitting the lateral deviations of the trailer and an indicating member placed near the steering wheel of the tractor, said means actuating said indicating member with such a ratio that said member indicates the direction and amplitude of the rotation which must be imparted to said steering wheel in order to neutralize any tendency of the trailer to deviate with respect to the tractor.

2. A device for insuring the stability of the direction during reverse motion of motor car trailers, comprising means for transmitting the lateral deviations of the trailer and an indicating member placed near the steering wheel of the tractor, said means actuating said indicating member with such a ratio that said member indicates the direction, and amplitude of the rotation which must be imparted to said steering wheel in order to neutralize any tendency of the trailer to deviate with respect to the tractor, and manually operated means for imparting supplementary motion to said indicating member in order to control the direction of the reverse movement of the trailer and tractor.

3. In a device for insuring the stability of the direction during reverse motion of motor car trailers, a differential gear comprising a crown wheel, two sun wheels and planet wheels, means for transmitting the lateral deviations of the trailer to said crown wheel, a pointer connected to one of said sun wheels, a dial rotatably mounted below said pointer, a mark on said dial, means for transmitting rotation from the steering wheel of the tractor to said dial, and manually operated means for rotating the other sun wheel of said differential gear.

4. A device for insuring the stability of the direction during reverse motion of motor car trailers comprising means for transmitting the lateral deviations of the trailer and an indicating member placed near the steering wheel of the tractor, said means actuating said indicating member so as to rotate said member at a speed proportional to the speed of deviation of the trailer and a second indicating member operatively connected with said steering wheel and mounted adjacent to the first mentioned indicating member.

5. A device for insuring the stability of the direction during reverse motion of motor car trailers comprising means for transmitting the lateral deviations of the trailer and an indicating member placed near the steering wheel of the tractor, said means actuating said indicating member so as to rotate said member at a speed proportional to the speed of deviation of the trailer, a second indicating member operatively connected with said steering wheel and mounted adjacent to the first mentioned indicating member, and manually operated means for imparting supplementary motion to said first indicating member in order to control the direction of the reverse movement of the trailer and tractor.

ANDRÉ HEKKING.